Feb. 16, 1937.   W. P-G. HALL ET AL   2,070,898
CENTERING AND COMPENSATING CHUCK
Filed Dec. 3, 1935   3 Sheets-Sheet 1

INVENTORS
William P.-G. Hall,
Peter P.-G. Hall.
BY
ATTORNEY

WITNESS

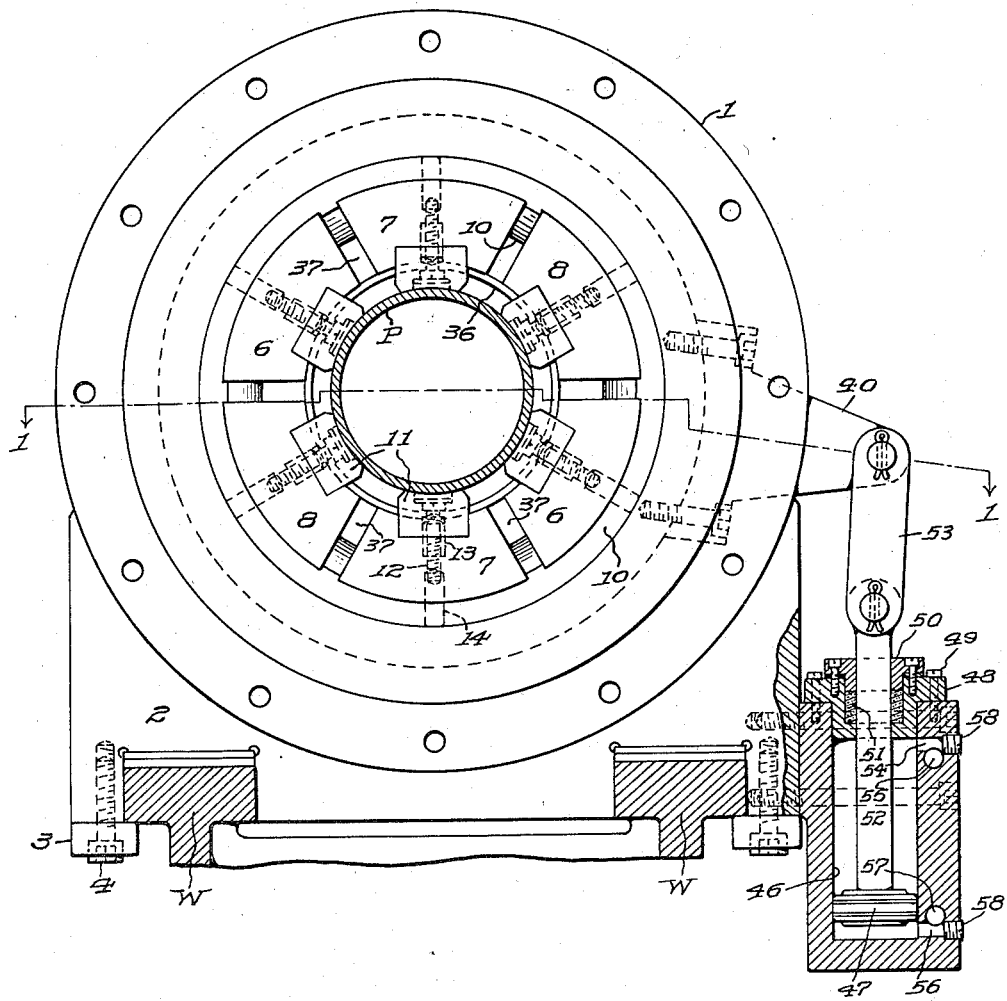

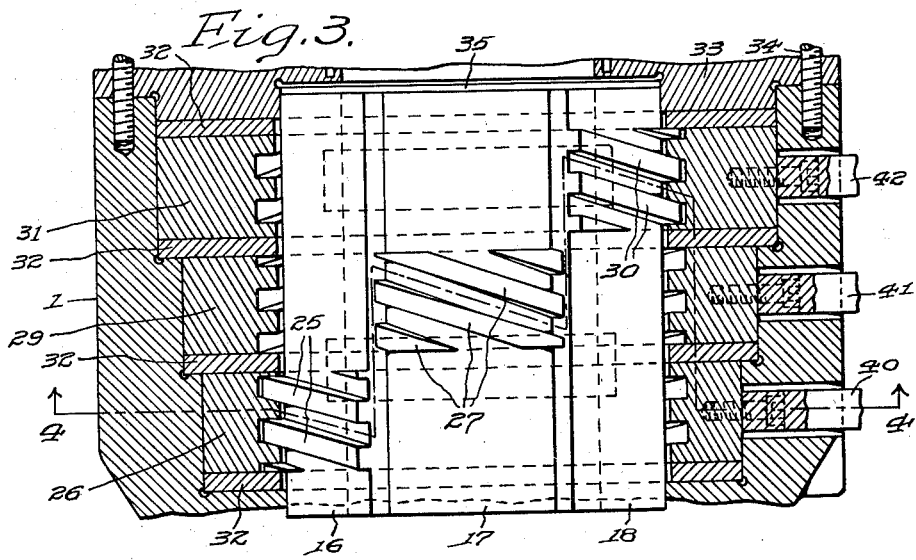
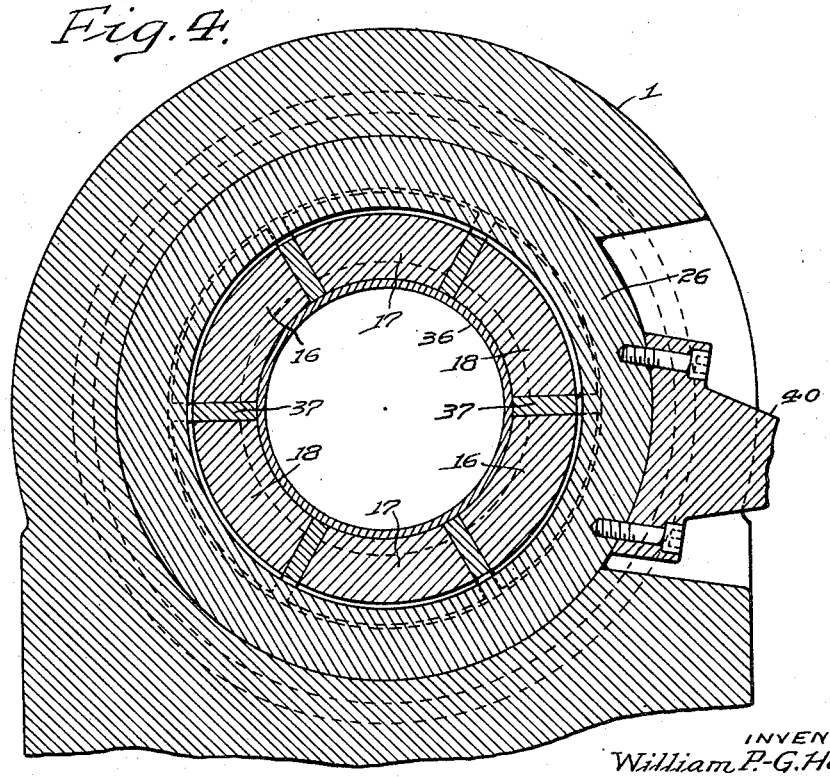

Patented Feb. 16, 1937

2,070,898

UNITED STATES PATENT OFFICE 2,070,898

CENTERING AND COMPENSATING CHUCK

William P-G. Hall and Peter P-G. Hall, Philadelphia, Pa., assignors to The Hall Planetary Company, Philadelphia, Pa., a corporation of Pennsylvania Application December 3, 1935, Serial No. 52,657

16 Claims. (Cl. 10—107)

While the chuck of our invention may be advantageously used for supporting many different kinds of work pieces while being subjected to various mechanical operations, it is of particular utility for holding hollow articles such as pipe in a fixed position while they are being machined, for example, while a thread is being milled at one end of the work piece.

Chucks heretofore commonly employed for a like purpose comprise a plurality of radially movable jaws which are brought against the work simultaneously while it is extended through the body of the chuck so that radially inwardly directed pressure is exerted at circumferentially spaced points upon the work to thereby hold it in position. Such chucks are generally satisfactory for the performance of their intended function if the outer surface of the work is exactly concentric with its axis, as there is then no tendency to spring or distort the hollow work through the inwardly radially directed pressure exerted thereon by the jaws; it therefore results that the work piece is properly centered in and held with respect to the chuck while the machining operation is being performed, and as the machine tool associated with the chuck and employed for the purpose is adapted to machine the work truly concentric with the axis of the chuck and thus of the work, the machined surface consequently remains concentric with the said axis after the pressure of the chuck jaws is subsequently relieved. However, if, as is generally the case, the surface of the pipe or other work is slightly non-concentric or out-of-round with respect to its axis, the pressure exerted by the chuck jaws as they move simultaneously inward springs or distorts the work from its normal condition so that after it is machined in truly concentric relation with the chuck axis and the pressure of the chuck jaws relieved, it springs back to its normal condition and thus throws the machined portion out of concentricity, the cross section of said portion becoming slightly elliptical.

It is therefore a principal object of our invention to provide a chuck adapted to hold a work piece such as a pipe in stationary position for the performance of some machining operation, such as the cutting of a thread thereon, without appreciable distortion of the work even though its outer surface is normally non-concentric with its axis.

A further object of the invention is the provision of a chuck of the character aforesaid which is operative to center the work accurately with respect to the axis of the chuck and to thereafter hold it stationary by the application of radially inwardly directed pressure at circumferentially spaced points on its surface.

Further objects of the invention are the provision of a chuck of this character which can be rapidly operated to center and chuck or unchuck the work; which will hold the work with the requisite rigidity for the cutting of an accurate thread or the performance of other machining operation thereon; which embodies a plurality of gripping jaws arranged in pairs respectively adapted to simultaneously move radially in paths normal to the chuck axis yet in which the several pairs of jaws are operative to ultimately apply the same amount of radially inwardly directed pressure to the surface of the work and thereby obviate distortion when it is held by the chuck, and which is of relatively simple design, construction and arrangement and not liable to get out of order or become damaged under the conditions of use to which machine tools are normally subjected.

Other objects, advantages and novel features of design, construction and arrangement comprehended by the invention are hereinafter more particularly pointed out or will be apparent to those skilled in the art from the following description of one embodiment thereof as illustrated in the accompanying drawings.

It will be of course appreciated that the chuck is designed for association with a machine tool adapted for performing the desired machining operation, such as cutting a thread, on the work piece while it is held in the chuck, and to enable those skilled in the art to comprehend and practice the invention we shall herein describe a preferred embodiment thereof in operative association with a milling machine of the well known "planetary" type, which is therefore operative to move a threading cutter having form threads without pitch radially into the work while the cutter is rotating on its own axis, to then carry the cutter about the work in a planetary orbit and simultaneously move it longitudinally at a rate of progression determined by the pitch of the desired thread and finally, on completion of the latter, to withdraw it radially from the work, it being understood, however, that we do not thereby desire or intend to in any way restrict the use of the chuck of our invention to operative combination and association with a thread milling machine of that character as it is equally capable of employment with other machine tools under conditions in which it is desired to properly center and hold a work piece in a fixed position while it is being machined.

In the said drawings:

Fig. 1 is a longitudinal axial section through the chuck and associated mechanism substantially on line 1—1 in Fig. 2, showing a pipe disposed therein as it appears after the completion of the threading operation, the threading cutter and certain of the adjacent parts of the thread milling machine with which the chuck is associated being also fragmentarily shown in plan and in similar section in a more or less general way;

Fig. 2 is a fragmentary end view of the chuck shown in Fig. 1 with certain parts removed to better show internal construction while others, as well as a part of the bed of the milling machine on which the chuck is supported, are shown in vertical section;

Fig. 3 is a fragmentary view partially in horizontal axial section and partially in elevation showing more particularly certain of the jaw actuating bars and their associated actuating rings.

Fig. 4 is a vertical section on line 4—4 of Fig. 3.

Throughout the drawings like characters of reference are used to designate the same parts.

Figure 1:
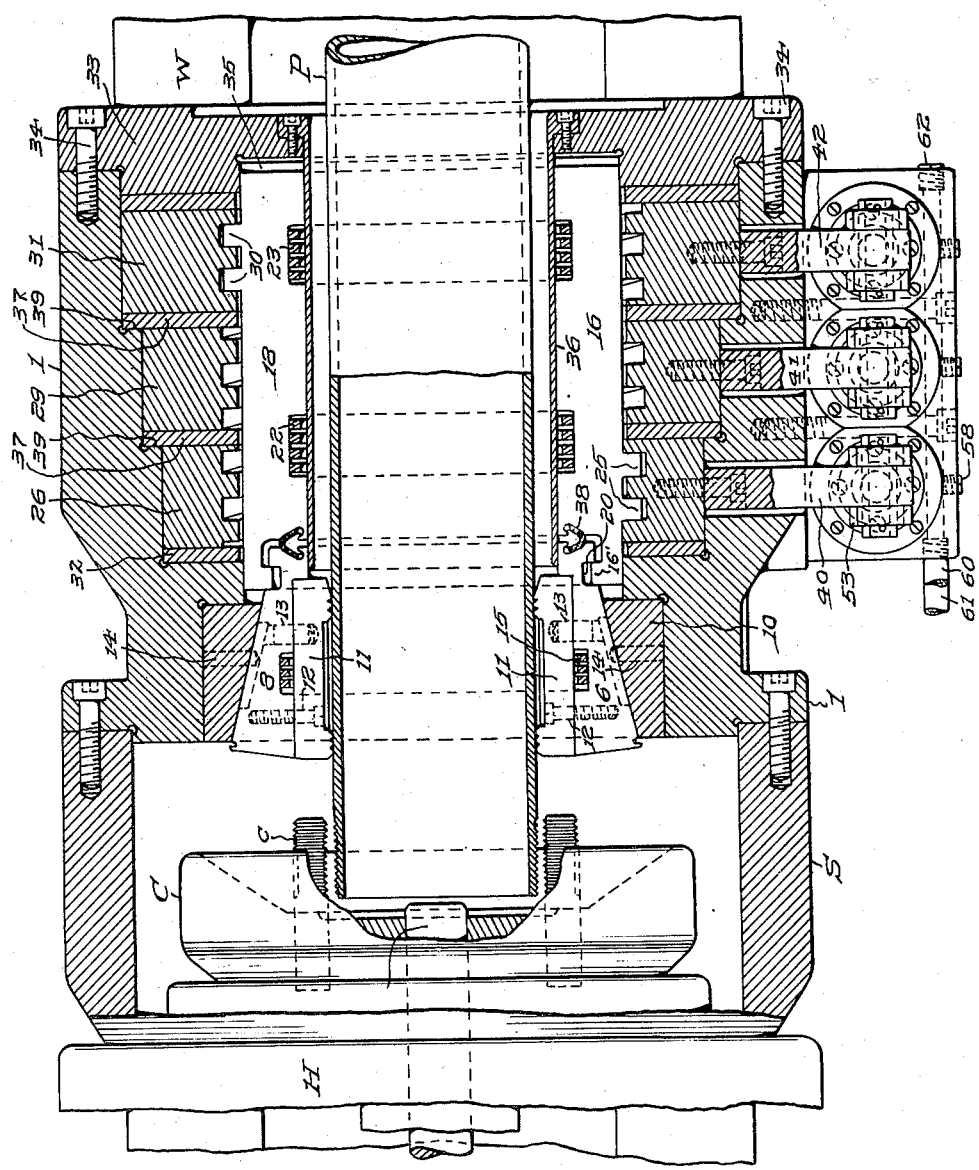

The milling machine proper as fragmentarily shown in the drawings comprises a head H rotatably supporting a cutter head C provided with a plurality of cutting elements c, an annular sleeve S surrounding the cutter head and extending to the chuck as hereinafter explained, and longitudinally extending ways W which serve to support the chuck. Since these various parts are of well known construction further description thereof would be superfluous.

The chuck proper comprises a generally hollow cylindrical housing 1 carried on a base 2 integral therewith which is fitted over the ways W and rigidly secured thereto by clamps 3 and bolts 4 or in any other convenient way. The housing is coaxial with the cutter axis and of course surrounds the work piece, for example, a pipe P, when the latter is gripped in the chuck, the leading end of the pipe being pushed through the chuck from that end of the machine remote from the cutter preparatory to its being engaged by the chuck jaws as hereinafter explained.

Adjacent the front end of the chuck, that is, the end proximate to the cutter, are disposed a plurality of jaws which are arranged in diametrically opposed pairs, the jaws of each pair being adapted for simultaneous radial movement toward or away from the axis of the chuck. In the particular embodiment shown, three pairs of jaws designated as 6—6, 7—7, 8—8 are employed and arranged in symmetrically circumferentially spaced relation in a heavy ring 10 stationarily seated in the forward end of the housing. This ring has an inclined inner face disposed so that the front end of the opening in the ring is of greater diameter than the rear end, and the outer faces of the chuck jaws are correspondingly inclined so that when the jaws are seated in the ring and their outer faces maintained in abutting relation therewith, longitudinal movement of the jaws to the left in Fig. 1 will impart to them an outward radial movement as well, while a corresponding movement to the right in said figure will cause them to move radially inward.

The inner faces of the jaws conform to arcs of a circle of which the axis of the chuck is the center and may, if desired, be employed for directly gripping the work but to increase the capacity of the chuck for holding work of different diameters as well as to facilitate renewal of the gripping faces when required, we prefer to provide each jaw with a removable shoe 11 which is seated in a longitudinally extending groove in the inner face of the jaw and removably held in place therein by a screw 12 and pin 13, the inner faces of these shoes being desirably provided with corrugations or the like to insure a firm grip on the work. Thus, by utilizing shoes of different radial thickness the chuck can be readily adapted for holding work of different diameters.

Each jaw is located in ring 10 by a pin 14 carried thereby the inner end of which projects into a groove or keyway in the outer face of the jaw so that while the latter can slide longitudinally in the ring it is prevented from moving circumferentially with respect thereto, while a relatively heavy substantially circular radially expandible spring 15 is disposed about the shoes in recesses in the inner faces of the jaws for the purpose of pressing the latter outwardly against the ring and maintaining them in constant engagement therewith.

Means now to be described are provided for moving the jaws with their attached shoes longitudinally to thereby move them radially inward or outward as required. These means comprise a series of draw bars, one for each jaw, the two bars controlling jaws 6—6 being numbered as 16—16, those controlling jaws 7—7 as 17—17, and those controlling jaws 8—8 as 18—18, the chuck shown being provided, in accordance with our preferred practise, with three pairs of jaws or six jaws in all, since such an arrangement effects a very accurate centering of the work but of course if a greater or fewer number of pairs of jaws are employed a corresponding number of bars are provided. Since all the draw bars are of similar construction save in the respects hereinafter mentioned, a description of one of them, for example, bar 16 shown in Fig. 1 as controlling one of the jaws 6, will suffice. Thus, the bar whose inner and outer surfaces are concentric with the chuck axis is arranged to extend longitudinally rearwardly from the jaw and at its forward end is provided with a hook 16' engaging in a groove 20 extending transversely across the rear end of the jaw as well as with longitudinally spaced transverse recesses in its face in which are respectively disposed relatively heavy substantially circular radially expandible springs 22, 23 which tend to force the bars outwardly in a generally radial direction. Projecting beyond the outer arcuate surface of the bar are a series of segmental screw threads 25 of relatively great pitch which extend across the bar from one side to the other and mesh in corresponding threads cut in the inner face of a ring 26 rotatably seated in the housing 1. The arrangement of the corresponding bar 16 disposed diametrically opposite the bar just described is in all respects similar, and it will thus be apparent that when the ring 26 is revolved the bars are moved longitudinally with respect to the chuck housing to thereby in turn move jaws 6 with their attached shoes either radially inward or outward depending on the direction of rotation of the ring. Desirably, threads 25 and the corresponding threads in the ring are made left hand as shown and square threads as distinguished from those of other form are preferably employed mainly because of their great strength under duty such as is required of them in the present instance.

Bars 17 controlling jaws 7 are identical in construction to bars 16 save that their thread segments 27 are disposed substantially midway between the ends of the bars and cooperate with corresponding threads in the inner face of a ring 29 preferably of somewhat greater external diameter than ring 26 seated in the chuck housing in rear thereof. Likewise, bars 18 controlling jaws 8 are similar to the other bars save that their thread segments 30 are disposed adjacent their rear ends and cooperate with similar threads in the inner surface of a third ring 31 seated in the housing rearwardly of ring 29 and preferably of greater external diameter than the latter. For maintaining rings 26, 29, 31 in properly spaced position longitudinally of the chuck and to receive the endwise thrust thereof, annular thrust plates 32 are located on opposite sides of the middle ring 29 and against the outer faces of the other rings, and an end plate 33 is removably secured against the rear end face of the housing by circumferentially spaced bolts 34, a suitable clearance 35 being provided between this plate and the adjacent ends of the bars to permit their requisite limited longitudinal movement. The end plate 33 also serves to support a relatively thin hollow cylindrical sleeve 36 which forms a seat for the inner faces of the bars and the rear ends of the jaw, the inner diameter of this sleeve being somewhat greater than the maximum diameter of the largest work piece the chuck is designed to accommodate, while spacer plates 37 interposed between the bars serve to maintain them in properly circumferentially spaced relation. An annular collar 38 of rubber or other flexible material and of substantially V-shape cross section may be inserted in a suitable groove formed in the rear ends of the jaws and the forward ends of the bars to form an oil seal at this point.

It therefore results that the rotation of ring 29 effects longitudinal movement of bars 17 and jaws 7 connected therewith and rotation of ring 31 likewise effects longitudinal movement of bars 18 and their interconnected jaws 8 in a manner similar to that already described in connection with bars 16 and jaws 6, each ring being capable of independent rotation without reference to the others to thereby move the bars cooperative therewith and all the various parts being snugly maintained within the chuck housing after assembly therein.

Since the endwise thrust exerted by the rings while the jaws are being locked on the work piece is greater than when they are being retracted therefrom we prefer, as just described, to make the rings of progressively greater diameter from the front of the chuck towards the rear and to form the interior of the housing correspondingly to thereby provide a series of annular offsets 39 which ultimately respectively receive and sustain the thrust of the rings during their locking movement. Thus not only is this heavy thrust resolved against the housing, but the possibility of the rings jamming together when under load is prevented and a freely operating mechanism insured.

For respectively rotating the rings through arcs of sufficient length to effect suitable longitudinal movement of the bars, ring 26 is provided with a radially extending crank arm 40 projecting through a suitable slot in the housing and rings 29 and 31 with like arms 41, 42 likewise projecting through slots therein, and each of said arms is interconnected to a fluid operated piston for actuation thereby. These pistons are disposed in a chest 45 bolted to that side of chuck base 2 which is adjacent the crank arms and at a suitable distance below the latter, the casting forming this chest being bored to provide three similar vertically extending cylinders respectively axially aligned with the crank arms, and as all of them are similar and the connections from their respective pistons to the superjacent crank arms are alike, a description of one of them, for example, cylinder 46 aligned with crank arm 40 and of the connections between its piston 47 and said arm, will suffice. Thus, the upper end of this cylinder is closed by a head 48 held in place by bolts 49 and fitted with a gland 50 adapted to compress packing 51 about the piston rod 52 extending upwardly from piston 47 to a pair of links 53 pivoted at their lower ends to the rods and at their upper ends to crank 40, and, as stated, each of the other cylinders contains a piston similarly connected with the superjacent crank 41 or 42 as the case may be. The several cylinders, the pistons and connections therefrom to the cranks are entirely independent of each other but each cylinder is connected at its upper end by a small passage 54 with a header 55 formed in the wall of the chest and similarly connected by a passage 56 at its lower end with a similar header 57; for convenience of manufacture passages 54, 56 may be drilled transversely through the chest wall to intersect the respective headers and then closed at their outer ends by plugs 58 as best shown in Fig. 3.

The headers are closed at one end and their other ends are respectively connected by pipes 60, 61 with a fluid control valve (not shown) in turn connected with means for supplying a fluid, preferably oil, under pressure and with a sump for receiving exhaust fluid. The valve may be of any suitable type adapted when properly actuated to selectively admit the fluid to either header and connect the other header with the sump. As each header communicates with all the cylinders, when the fluid is admitted above the pistons they tend to move downwardly and force any fluid beneath them into the other header and thence through the valve to the sump and vice versa, whereby through suitable actuation of the valve the direction of movement of the pistons can be controlled. For convenience of manufacture, and also to facilitate extension of pipes 60, 61 to the valve from either end of the cylinder chest, the headers are preferably run entirely through the latter from end to end and plugs 62 inserted in that end of each header it is desired to close.

*Operation*

Brief reference will now be made to the operation of the mechanism heretofore described during the cycle incident to chucking a piece of pipe, threading it and withdrawing it from the chuck: Preparatory to insertion of the pipe, an actuating fluid, preferably oil, is admitted through operation of the control valve to cylinders 46 beneath pistons 47 and as all the cylinders are connected an equal pressure is exerted on each piston to thereby rotate rings 26, 29, and 31 in a counter-clockwise direction when viewed as in Fig. 2 and thus, assuming that the threads within them are left hand as shown, the actuating bars 16, 17, 18 are caused to move forward or to the left in Fig. 1 to slide the jaws on ring 10 in a direction to move them radially outward from the axis for a sufficient distance to permit the pipe to be thereafter inserted between them. The pipe is now pushed through the chuck toward the cutter while suitably supported by a chain hoist or other convenient means until it is brought to the desired position of transverse alignment with the cutter C, as determined in any convenient way. By suitable actuation of the control valve, oil is next admitted to header 55 and thus to the upper side of the several pistons and header 57 is connected with the sump so that the oil beneath the pistons can be exhausted during their ensuing downward movement. Since all the pistons are of the same size and an equal pressure is exerted on all of them by the oil, they move simultaneously, assuming that the frictional resistance thereto afforded by the operating mechanism interposed between each pair of jaws and its piston is substantially similar to that of the others, until one pair of jaws, for example jaws 6, or one jaw of such pair, encounters the pipe or for some other reason, such as friction in the operating mechanism, is subjected to greater resistance to further inward movement than the other jaws. As soon as this condition obtains, movement of the pair of jaws encountering the heightened resistance is temporarily arrested, while the other pairs continue to move in until the jaws of one pair or one jaw in such pair in turn encounters the pipe or is otherwise subjected to greater resistance when their movement in turn is temporarily arrested while the third pair continues its inward movement. Thus so long as the several pairs of jaws encounter an equal resistance to inward movement, they continue to close simultaneously toward the axis of the chuck, but the moment one or both jaws of any pair encounter a greater resistance than the other pairs, the movement of that pair stops so that the several pairs of jaws move alternately and selectively inward until the pipe is finally centered and equal resistance exerted against further movement of all of them with the result that equal inwardly radially directed pressure is thereafter exerted on the pipe by all of the jaws even though its outer surface is non-concentric with its axis, so that it is held without distortion and has no tendency to spring back to its original shape after the pressure of the jaws is released following the machining operation.

After the machining operation is completed the control valve is operated so as to connect header 55 with the sump and admit oil to header 57, thereby raising the pistons simultaneously in the cylinders to turn rings 26, 29, 31 anticlockwise and retract the jaws from the pipe to permit its withdrawal from the chuck, thereby concluding the cycle.

It will now be apparent that we have provided a chuck which is operative to accurately center and thereafter firmly hold a work piece the outer surface of which is non-concentric with its axis or otherwise out-of-round, and further that since after reaching their ultimate gripping position all the jaws exert substantially the same pressure upon the work piece it is not distorted or deformed from its normal or original shape while disposed in the chuck with the result that when its end is threaded or otherwise machined in exact concentricity with the axis of the chuck and machine tool, the machined area thereafter remains truly circular in cross section.

While we have described one embodiment of our invention with considerable particularity, we do not thereby desire or intend to restrict or confine ourselves thereto in any way as numerous changes and modifications may be made in the design, construction and arrangement of the various parts to adapt the invention to different conditions of use or to facilitate its employment with machine tools of various sorts or for other purposes without departing from the spirit and scope of the invention as defined by the appended claims.

Having thus described our invention, we claim and desire to protect by Letters Patent of the United States:

1. Apparatus of the class described comprising a housing, a plurality of pairs of jaws respectively movable longitudinally and radially of the housing, means operable to move each pair of jaws simultaneously in both of said directions, and fluid operated means for actuating all said jaw moving means simultaneously or selectively in accordance with the degree of resistance to radial movement encountered by each of the pairs of jaws.

2. Apparatus of the character described comprising a housing providing an outwardly inclined surface located adjacent an end thereof, a plurality of jaws disposed in diametrically opposed pairs against said surface and respectively conforming thereto, a draw bar extending from each jaw longitudinally within the housing, means respectively cooperative with each diametrically opposed pair of bars operable to impart longitudinal movement thereto to thereby move the corresponding jaws radially along said surface, and fluid controlled means for simultaneously or selectively moving the several bar actuating means in accordance with the resistance encountered by the jaws respectively controlled thereby during their said radial movement.

3. Apparatus of the character described comprising a generally cylindrical housing providing an outwardly inclined surface, a plurality of jaws arranged in oppositely disposed pairs against said surface and longitudinally slidable thereon to thereby impart radial movement to the jaws, means for imparting longitudinal movement to each pair of jaws individually comprising a draw bar extending from each jaw of said pair substantially parallel to the axis of the housing and provided with external thread segments and a ring correspondingly internally threaded for cooperation therewith, and fluid actuated means for rotating the several rings either simultaneously or selectively in accordance with the resistance encountered by the jaws respectively controlled thereby during their radial movement.

4. Apparatus of the character described comprising a generally cylindrical housing providing an outwardly inclined surface adjacent one of its ends, a plurality of jaws arranged in oppositely disposed pairs against said face and longitudinally slidable thereon to thereby impart radial movement to the jaws, means for imparting longitudinal movement to each pair of jaws individually comprising a draw bar extending from each jaw of said pair substantially parallel to the axis of the housing and provided with external thread segments and a ring correspondingly internally threaded for cooperation therewith, the segments on each diametrically opposed pair of bars being longitudinally spaced from the segments on the other pairs, and fluid actuated means for rotating the several rings either simultaneously or selectively in accordance with the resistance encountered by the jaws respectively controlled thereby during their radial movement.

5. Apparatus of the character described comprising a generally cylindrical housing, a ring seated therein adjacent one end of the housing having an outwardly inclined inner face, a plurality of jaws slidably engaging said face and arranged in diametrically opposed symmetrically disposed pairs, a draw bar extending from each jaw longitudinally of the housing, each bar having thread segments on its outer surface in transverse alignment with those on the other diametrically opposed bar and spaced longitudinally from the corresponding segments on the other bars, a series of internally threaded rings surrounding all the bars and respectively cooperative with the thread segments on the diametrically opposed pairs thereof, and means for oscillating the rings comprising a fluid actuated piston connected with each ring, interconnected cylinders respectively enclosing said pistons, and means for admitting fluid under pressure to all the cylinders on either side of the pistons thereby to maintain substantially uniform pressure within all the cylinders to actuate the pistons therein and effect radial movement of the respective pairs of jaws in accordance with the resistance to such movement encountered thereby.

6. Apparatus of the character described comprising a generally hollow cylindrical housing, a ring seated in one end of the housing having an outwardly inclined inner face, six jaws disposed within the ring in diametrically opposed pairs in sliding engagement with said face, each jaw having a transverse groove at its inner end, means for maintaining the jaws in symmetrically circumferentially spaced relation within the ring, a draw bar associated with each jaw extending longitudinally in the housing and having a hook engaging the groove in the adjacent jaw and thread segments on its outer surface extending generally transversely of the bar, three internally threaded rings disposed in longitudinally spaced relation about the bars, the threads in each ring cooperating with the threads on diametrically opposed bars, means for maintaining the rings in assembled relation with the housing, a chest disposed adjacent the housing provided with three cylinders and passages connecting the respective ends of said cylinders with each other, a piston in each cylinder, a connection extending from each piston to one of the rings, and means for selectively admitting fluid through said passages to opposite sides of the pistons to thereby actuate the latter to move the rings and in turn the draw bars and jaws.

7. In apparatus of the class described, a plurality of jaws arranged in diametrically opposed pairs and movable longitudinally and radially, a longitudinally extending draw bar connected with each jaw, each diametrically opposed pair of bars having transversely aligned thread segments on their outer surfaces and the segments on each such pair of bars being longitudinally spaced from the segments on the other pairs, an internally threaded ring surrounding the bars but cooperative only with the thread segments on two diametrically opposed bars, and means for oscillating the ring to move longitudinally in either direction the two bars with which it is cooperative and thereby impart combined longitudinal and radial movement to the jaws respectively with said bars.

8. In apparatus of the class described, a plurality of jaws arranged in diametrically opposed pairs and movable longitudinally and radially, a longitudinally extending draw bar connected with each jaw, each diametrically opposed pair of bars having transversely aligned thread segments on their outer surfaces and the segments on each such pair of bars being longitudinally spaced from the segments on the other pairs, a series of internally threaded rings surrounding the bars, each ring cooperating with the thread segments on one pair of diametrically opposed bars, and means for turning all the rings simultaneously in one direction or the other to move longitudinally the bars respectively cooperative with each ring and thereby impart to the jaws associated with such bars a combined longitudinal and radial movement.

9. In apparatus of the class described, a plurality of jaws arranged in diametrically opposed pairs and movable longitudinally and radially, a longitudinally extending draw bar connected with each jaw, each diametrically opposed pair of bars having transversely aligned thread segments on their outer surfaces and the segments on each such pair of bars being longitudinally spaced from the segments on the other pairs, a series of internally threaded rings surrounding the bars, each ring cooperating with the thread segments on one pair of diametrically opposed bars, and fluid operated means for turning all the rings simultaneously in one direction or the other to move longitudinally the bars respectively cooperative with each ring and thereby impart to the jaws associated with such bars a combined longitudinal and radial movement.

10. Apparatus of the character described comprising a housing providing a substantially frusto-conical bearing surface adjacent one of its ends, a plurality of pairs of diametrically disposed work engaging jaws slidably engaging said surface, a draw bar interconnected with each jaw operable to move the jaw longitudinally in the housing, the bars for actuating the jaws of each pair having transversely aligned thread segments on their outer surfaces, an internally threaded ring cooperable with each pair of aligned thread segments adapted for partial rotation about the axis of the housing to effect longitudinal movement of the bars therein, fluid pressure responsive means for independently rotating the rings, and means for equalizing the pressure of the fluid supplied to said fluid responsive means to thereby rotate the rings in inverse ratio to forces respectively resisting such rotation.

11. Apparatus of the character described comprising a cylindrical housing, a plurality of pairs of work engaging jaws disposed in symmetrical diametrically opposed relation about the axis of the housing and means operable to effect radial movement of each pair of jaws independently of the other pairs comprising rotatable rings in number corresponding to the several pairs of jaws respectively interconnected therewith, an arm carried by each ring, fluid pressure responsive means for actuating each of the arms independently, and means for equalizing the pressure of fluid supplied thereto.

12. In apparatus of the character described, a plurality of independently movable internally threaded jaw actuating rings, a plurality of pairs of work engaging jaws, means externally threaded interposed between the jaws of each pair and a corresponding ring and cooperative therewith to effect radial movement of the jaws in accordance with the rotative movement of the ring, means for simultaneously rotating the rings comprising a chest providing a plurality of cylinders, fluid responsive pistons in said cylinders respectively interconnected with the rings, and means for selectively supplying fluid at equal pressure to all of said cylinders on either side of the pistons therein.

13. In apparatus of the character described, a plurality of pairs of work engaging jaws, means operative to effect radial movement of the jaws of each pair independently of the others comprising draw bars and a rotatable ring, an arm carried by each ring, a chest disposed adjacent the rings and providing a cylinder corresponding with each ring, a piston slidable in each cylinder and interconnected with the arm of the corresponding ring, and means for simultaneously introducing fluid under pressure to said cylinders to thereby exert substantially equal pressure against all of said pistons and rotate the rings substantially in inverse ratio to the resistance to such rotation offered by the jaws corresponding thereto.

14. In apparatus of the character described, a plurality of jaws arranged in diametrically opposed pairs movable longitudinally and radially, a longitudinally extending draw bar connected with each jaw, each diametrically opposed pair of bars having transversely aligned thread segments on their outer surfaces and the segments on each such pair being longitudinally spaced from the segments on the other pairs, a series of internally threaded rings of progressively greater external diameter, each ring cooperating with the thread segments on one pair of diametrically opposed bars, a housing surrounding the rings having longitudinally spaced internal cylindrical surfaces respectively substantially conforming in diameter thereto and radial surfaces therebetween forming thrust receiving faces, means for maintaining the rings in assembled position in the housing, and means for turning all the rings simultaneously in one direction or the other to move longitudinally the bars respectively cooperating with each ring and thereby impart to the jaws associated with such bars a combined longitudinal and radial movement.

15. In apparatus of the character described, a plurality of jaws arranged in diametrically opposed pairs movable longitudinally and radially, a longitudinally extending draw bar connected with each jaw, each diametrically opposed pair of bars having transversely aligned thread segments on their outer surfaces and the segments on each such pair being longitudinally spaced from the segments on the other pairs, a series of internally threaded rings of progressively greater external diameter, each ring cooperating with the thread segments on one pair of diametrically opposed bars, a housing enclosing the rings having concentric bores of progressively greater diameter respectively forming annular seats for the rings and annular radial surfaces between the said bores providing thrust receiving surfaces therefor, means carried by the housing for retaining said rings and plates in assembled relation therein, and fluid operated means for turning all the rings simultaneously in one direction or the other to move longitudinally the bars respectively cooperating with each ring and thereby impart to the jaws associated with such bars a combined longitudinal and radial movement.

16. In apparatus of the character described, a plurality of jaws arranged in diametrically opposed pairs movable longitudinally and radially, a longitudinally extending draw bar connected with each jaw, each diametrically opposed pair of bars having transversely aligned thread segments on their outer surfaces and the segments on each such pair being longitudinally spaced from the segments on the other pairs, a series of internally threaded rings of progressively greater external diameter, each ring cooperating with the thread segments on one pair of diametrically opposed bars, a housing enclosing the rings having concentric bores of progressively greater diameter respectively forming annular seats for the rings and annular radial surfaces between the said bores providing thrust receiving surfaces therefor, annular thrust plates disposed against the ends of the rings and respectively engaging said surfaces, an annular end plate carried by the housing for retaining said rings and plates in assembled relation therein, and fluid operated means for turning all the rings simultaneously in one direction or the other to move longitudinally the bars respectively cooperating with each ring and thereby impart to the jaws associated with such bars a combined longitudinal and radial movement.

WILLIAM P-G. HALL.
PETER P-G. HALL.